United States Patent [19]

Richey et al.

[11] Patent Number: 5,538,741
[45] Date of Patent: Jul. 23, 1996

[54] SUGARLESS NON-TACK CHEWING GUM

[75] Inventors: Lindell C. Richey, Lake Zurich; Michael R. Dzija, La Grange Park, both of Ill.

[73] Assignee: Wm. Wrigley Jr. Company, Chicago, Ill.

[21] Appl. No.: 361,964

[22] Filed: Dec. 22, 1994

[51] Int. Cl.$^6$ .................................................. A23G 3/30
[52] U.S. Cl. .................................................. 426/4; 426/658
[58] Field of Search .................................. 426/3–6, 658

[56] References Cited

U.S. PATENT DOCUMENTS

| | | | |
|---|---|---|---|
| 3,255,018 | 6/1966 | Comollo | 99/135 |
| 3,984,574 | 10/1976 | Comollo | 426/4 |
| 4,271,197 | 6/1981 | Hopkins et al. | 426/3 |
| 4,352,822 | 10/1982 | Cherukuri et al. | 426/4 |
| 4,357,355 | 11/1982 | Koch et al. | 426/4 |
| 4,382,962 | 5/1983 | Devos et al. | 426/3 |
| 4,387,108 | 6/1993 | Koch et al. | 426/4 |
| 4,415,593 | 11/1983 | Glass et al. | 426/4 |
| 4,452,820 | 6/1984 | D'Amelia et al. | 426/3 |
| 4,514,422 | 4/1985 | Yang et al. | 426/3 |
| 4,671,961 | 6/1987 | Patel et al. | 426/3 |
| 4,671,967 | 6/1987 | Patel et al. | 426/658 |
| 4,753,806 | 6/1988 | Carroll et al. | 426/3 |
| 4,774,094 | 9/1988 | Carroll et al. | 426/3 |
| 5,085,872 | 2/1992 | Patel et al. | 426/4 |
| 5,087,459 | 2/1992 | Chuu et al. | 426/4 |
| 5,120,551 | 6/1992 | Yatka et al. | 426/3 |
| 5,178,889 | 1/1993 | Reed et al. | 426/3 |
| 5,192,562 | 3/1993 | Grey et al. | 426/4 |
| 5,223,282 | 6/1993 | Patel et al. | 426/3 |
| 5,266,336 | 11/1993 | McGrew et al. | 426/4 |
| 5,286,499 | 2/1994 | Courtright | 426/3 |

FOREIGN PATENT DOCUMENTS

| | | | |
|---|---|---|---|
| 0067665 | 12/1982 | European Pat. Off. | A23G 3/30 |
| 58-006454 | 2/1983 | Japan | A23G 3/30 |
| 94-125713 | 5/1994 | Japan | A23G 3/30 |

OTHER PUBLICATIONS

U.S. patent application Ser. No. 08/174,983, filed Dec. 29, 1993, entitled "Liquid Sorbitol/Mannitol/Glycerin Blend And Composition Containing Same", Inventors Mazurek, et al.

U.S. patent application Ser. No. 08/239,137, filed May 6, 1994, entitled "Chewing Gum Including A Liquid Sorbitol/Mannitol/Glycerin Blend", Inventors Mazurek, et al.

U.S. patent application Ser. No. 08/360,027, filed Sep. 14, 1994, entitled "Abhesive Chewing Gum With Improved Sweetness Profile", Inventors Synosky et al.

*Primary Examiner*—Jeanette Hunter
*Attorney, Agent, or Firm*—Brinks Hofer Gilson & Lione

[57] ABSTRACT

A sugarless non-tack chewing gum having excellent cohesive properties and flavor is prepared using a non-tack gum base which is typically less cohesive or even crumbly. The lack of cohesiveness in the gum base is overcome by adding, to the chewing gum, a syrup blend including glycerin with evaporated hydrogenated starch hydrolysates and water. The syrup blend is preferably prepared by coevaporating a mixture of glycerin with a conventional aqueous hydrogenated starch hydrolysate solution, in order to remove much of the water. The syrup blend acts as a binder for the gum base and chewing gum ingredients without causing the gum to adhere to teeth and dentures.

22 Claims, No Drawings

SUGARLESS NON-TACK CHEWING GUM

FIELD OF THE INVENTION

The present invention is a sugarless non-tack chewing gum with improved textural and chewing properties.

BACKGROUND OF THE INVENTION

U.S. Pat. No. 3,984,574, issued to Comollo, discloses an adhesive (non-tack) gum base in which the non-tack properties were achieved by eliminating conventional gum base ingredients found to contribute to chewing gum tackiness, and substituting non-tacky ingredients in their place. Specifically, it was discovered that some elastomers, resins and waxes contribute to chewing gum tackiness.

Comollo eliminated natural and some synthetic elastomers from gum base, and substituted non-tacky synthetic elastomers such as polyisobutylene, polyisoprene, isobutylene-isoprene copolymer and styrene-butadiene copolymer. Comollo also eliminated tack-producing natural resins and modified natural resins, and replaced them with higher amounts of hydrogenated or partially hydrogenated vegetable oils or animal fats. Also, Comollo excluded waxes from the gum base, but included polyvinyl acetate, fatty acids and mono and diglycerides of fatty acids.

Other efforts to develop tack-free gum bases and chewing gums are also known in the art. For example, U.S. Pat. No. 4,415,593, issued to Glass et al., discloses a non-stick chewing gum in which the gum base includes polyisoprene obtained from a naturally occurring guayule rubber. U.S. Pat. No. 4,387,108, issued to Koch et al., discloses a reduced tack gum base containing an elastomer, lecithin or lecithin derivatives, glycerol ester of partially hydrogenated wood rosin, a mineral adjuvant, a non-toxic vinyl polymer, and an oleaginous plasticizer. U.S. Pat. No. 5,087,459, issued to Chuu et al., discloses a non-tack chewing gum whose gum base includes a terpene resin, high melting wax, low melting wax, elastomer, polyvinyl acetate, emulsifier, filler, and gum base solvent. Other non-tack gum bases and gums are also known.

A problem with many non-tack chewing gums is that the gum base ingredients which caused product tackiness also provided cohesive forces which held the gum base and chewing gum together. Thus, when tackiness is eliminated by removing certain ingredients or combinations of ingredients, the resulting chewing gum base would often break apart into distinct loaves or chunks which would not mix and disperse properly during manufacture of the chewing gum. The resulting chewing gum product would often exhibit short texture, meaning that it was easy to break, separate or crumble. In the case of sugarless non-tack gums, some of the non-tack gum bases produced undesirable sensory qualities such as a burning flavor. Therefore, there is a need or desire in the chewing gum industry for a non-tack gum base and chewing gum which exhibit ample cohesive bonding between the ingredients notwithstanding the absence of tackiness to external surfaces such as teeth and dentures, and which have improved sensory qualities.

SUMMARY OF THE INVENTION

The present invention is directed to a non-tack sugarless chewing gum in which the ingredients exhibit excellent cohesive strength between each other without causing the gum to stick to external surfaces such as teeth and dentures. The chewing gum of the invention does not exhibit short texture and does not easily break, rupture or separate during processing and handling. The chewing gum also has good sensory qualities.

An essential ingredient in the non-tack sugarless chewing gum of the invention is a coevaporated blend including glycerin, hydrogenated starch hydrolysates (HSH) and some remaining water. This syrup blend is prepared by mixing glycerin with a commercially available mixture of water and HSH to form a three-component blend, and then evaporating most of the water from the blend. This coevaporated blend is in the form of a syrup prior to addition into the chewing gum. It has been discovered that this syrup blend serves as an excellent binder between non-tack chewing gum ingredients, including the gum base ingredients, without causing adhesion to teeth or dentures. The syrup blend may be added after manufacture of the gum base, and during manufacture of the final chewing gum product. The syrup blend should constitute about 1 to about 20% by weight of the chewing gum.

The non-tack gum base may be any known gum base which could stand to benefit from improved binding between its ingredients. Non-tack bases which do not contain terpene resin (a known binder) could especially stand to benefit from the inclusion of the syrup blend in the chewing gum. Such non-tack gum bases include, but are not limited to, the gum bases described in the above-identified patent to Comollo. Conventional Comollo-type bases include about 5–35% by weight of an elastomer selected from polyisobutylene, polyisoprene, isobutylene-isoprene copolymer, styrene-butadiene copolymer, and mixtures thereof. Conventional Comollo-type bases also include about 5–50% by weight hydrogenated vegetable oils and/or animal fats; about 5–40% by weight mineral adjuvants (also known as fillers); about 0–55% by weight polyvinyl acetate; about 0–20% by weight fatty acids; and about 0–10% by weight monoglycerides and/or diglycerides of fatty acids.

As explained above, the syrup blend is added during manufacture of the chewing gum. Except for the addition of the syrup blend, the underlying chewing gum composition may be any non-tack chewing gum which could stand to benefit from improved binding between its ingredients. Generally, such chewing gums would include any gum having a non-tack gum base which could stand to benefit from improved binding. Often, the cohesiveness of a conventional chewing gum product, or lack thereof, has been dependent upon the cohesiveness of the gum base used in the chewing gum, or lack thereof.

With the foregoing in mind, it is a feature and advantage of the invention to provide a sugarless non-tack chewing gum having excellent cohesive properties.

It is also a feature and advantage of the invention to provide a non-tack sugarless chewing gum having excellent cohesive properties which contains a typically less cohesive non-tack base.

It is also a feature and advantage of the invention to provide a method of making a cohesive non-tack sugarless chewing gum using a relatively non-cohesive non-tack chewing gum base.

The foregoing and other features and advantages of the invention will become further apparent from the following detailed description of the presently preferred embodiments, read in conjunction with the accompanying examples. The detailed description and examples are merely illustrative of the invention rather than limiting, the scope of the invention being defined by the appended claims and equivalents thereof.

DETAILED DESCRIPTION OF THE PRESENTLY PREFERRED EMBODIMENTS

In accordance with the invention, a syrup blend including coevaporated glycerin, HSH and some water is added during manufacture of a non-tack gum base, or during manufacture of a non-tack chewing gum, or both. The glycerin in the syrup blend is present at about 15–30% by weight of the syrup blend, preferably about 22–28% by weight of the syrup blend, most preferably about 25% by weight of the syrup blend. The HSH solids are present at about 65–72% by weight of the syrup blend, preferably about 67–70% by weight of the syrup blend, most preferably about 67.5% by weight of the syrup blend. The water is present at about 5–10% by weight of the syrup blend, preferably about 6.5–8.5% by weight of the syrup blend, most preferably about 7.5% by weight of the syrup blend.

The syrup blend can be prepared using a commercially available aqueous HSH solution which initially contains about 70–75% by weight HSH solids and about 25–30% by weight water. One suitable aqueous HSH solution is Lycasin brand HSH available from Roquette Corp., located in Gurnee, Ill.

The aqueous HSH solution can be blended with glycerin using whatever ratio is needed to achieve the desired composition of the syrup after evaporation of some of the water. Generally about 75–80% by weight aqueous HSH solution is mixed with about 20–25% by weight glycerin. Preferably, about 78.3% by weight aqueous HSH solution is mixed with about 21.7% by weight glycerin. Any suitable mixer can be used.

Once the aqueous HSH and glycerin have been blended, the blend can be coevaporated to remove most of the water, resulting in a syrup blend having the desired water content. This coevaporation can be accomplished with or without vacuum, and by heating the blend. Preferably, the blend is heated under a vacuum of at least about 25 mm Hg, at a temperature of about 130° to about 195° F. Preferably, the coevaporation will occur along an isobar in which the partial vapor pressure of the water in the blend at least equals the pressure of the atmosphere above the blend. By performing the coevaporation at or near boiling conditions for the water, the speed of the evaporation can be optimized.

When the syrup blend is added to a chewing gum, the non-tack gum base may be any conventional nontack gum base, but should be a non-tack gum base which does not contain a terpene resin. The reason for this is terpene resins already provide some cohesion to a gum base, and the benefits of adding the syrup blend are less pronounced when a terpene resin is already present. Preferably, the gum base will be a non-tack base including the following ingredients:

| Ingredient | % By Weight Of Gum Base |
| --- | --- |
| Synthetic Elastomer | 5–35 |
| Hydrogenated and/or Partially Hydrogenated Vegetable Oil and/or Animal Fats | 5–50 |
| Fillers | 5–40 |
| Polyvinyl Acetate | 0–55 |
| Fatty Acids | 0–20 |
| Monoglycerides and/or Diglycerides of Fatty Acids | 0–10 |

The synthetic elastomer should be an elastomer which does not contribute significant tackiness to the gum base and sugarless chewing gum. Preferably, the synthetic elastomer includes one or more of polyisobutylene, polyisoprene, isobutyleneisoprene copolymer; and styrene-butadiene copolymer.

A wide variety of hydrogenated and/or partially hydrogenated vegetables oils and/or animal fats may be utilized as gum base softeners. Examples of suitable vegetable oils include hydrogenated and partially hydrogenated soybean oil, cottonseed oil, corn oil, peanut oil, and palm oil. Examples of suitable animal fats include tallow and lard.

A variety of fillers may also be used in the non-tack gum base. Preferred fillers include calcium carbonate, magnesium carbonate, talc, tricalcium phosphate, or mixtures thereof.

Polyvinyl acetate may be included in the nontack gum base. When included, the polyvinyl acetate preferably has a weight average molecular weight of at least about 2000.

Fatty acids, monoglycerides of fatty acids, and/or diglycerides of fatty acids may also be included in the base. Suitable fatty acids include stearic, palmitic, oleic, linoleic and linolenic acids, mono and diglycerides of these acids, and mixtures thereof.

The non-tack gum base preferably does not include natural gums combined with natural resins and rosin derivatives, and with resins or waxes of petroleum origin; natural gums combined with natural or synthetic rubbers and resins such as rosin derivatives, polyvinyl acetate, and polyterpenes; natural gums combined with natural or synthetic rubbers and waxes of petroleum or natural origin; or natural or synthetic rubbers combined with waxes and resins. The foregoing combinations of ingredients are known to impart unwanted tack to the gum base and chewing gum.

The non-tack gum base can be made using any known process for making gum base. For instance, the gum base ingredients may be added and mixed using a conventional batch mixing process, such as a sigma blade mixer. The gum base can also be prepared using a continuous mixer, for example, a twin screw extruder, single screw extruder, paddle mixer or blade-and-pin mixer. Various techniques for preparing gum base are known, and do not constitute part of the invention.

The non-tack gum base constitutes about 5–95% by weight of the non-tack chewing gum, preferably about 10–50% by weight of the chewing gum, most preferably about 20–30% by weight of the chewing gum. In addition to the gum base, which is generally water-insoluble, the non-tack chewing gum includes a water-soluble bulk portion and one or more flavoring agents. The water-soluble portion dissipates over a period of time during chewing. The gum base remains in the mouth throughout the chewing process.

The syrup blend should be present in the chewing gum product at a level of about 1–20% by weight, preferably about 3–15% by weight, most preferably about 5–10% by weight. The water soluble portion of the chewing gum may further include chewing gum softeners, bulk sugarless sweeteners, high intensity sweeteners, flavoring agents and combinations thereof, in addition to the syrup blend of glycerin, HSH and water. Depending on the amount of the syrup blend in the gum, a softener may be added in order to balance the texture, i.e., to optimize the chewability and mouth feel of the gum. When used, softeners, which are also known as plasticizers or plasticizing agents, generally constitute between about 0.5–15% by weight of the chewing gum. Conventional softeners include additional glycerin, lecithin, and combinations thereof. However, it is preferred that a softener, if used, does not also act as an emulsifier because emulsification may disrupt the cohesiveness of the texture by causing dissolution of the syrupy blend. For this reason, a medium chain triglyceride is preferred over lecithin. A suitable medium chain triglyceride is generically known as captrin.

Bulk sugarless sweeteners constitute between 5–95% by weight of the chewing gum, more typically 20–80% by weight of the chewing gum and most commonly 30–60% by weight of the chewing gum. Sugarless sweeteners are components with sweetening characteristics which are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with the sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

The non-tack chewing gum can be manufactured by sequentially adding the various chewing gum ingredients to any commercially available batch or continuous mixer known in the art. After the ingredients have been thoroughly mixed, the gum is discharged from the mixer and shaped into the desired form such as by rolling into sheets, scoring and cutting into sticks. Generally, the ingredients are mixed by first melting the gum base and adding It to the running mixer. The gum base may alternatively be melted or prepared in the mixer. Color can be added at this time.

The syrup blend of glycerin, HSH and water can be added next along with part of the bulk portion and a softener, if any. Further parts of the bulk portion can then be added. Flavoring agents are typically added with the final part of the bulk portion. The average mixing time typically takes from 5–15 minutes, although longer mixing times are sometimes required. Those skilled in the art will recognize that variations of this mixing procedure, or other mixing procedures, may be followed.

A wide range of changes and modifications to the embodiments of the invention described about will be apparent to persons skilled in the art. The following examples are not to be construed as imposing limitations on the invention, but are included merely to illustrate preferred embodiments.

EXAMPLE 1

The following is an example of a typical non-tack, non-terpene containing gum base useful in the non-tack chewing gums of the invention. This base was prepared using a conventional gum base manufacturing process.

| Ingredient | % By Weight In Gum Base |
|---|---|
| Butyl Rubber (SBR) | 9.956 |
| Fats and Oils | 39.028 |
| Antioxidant (BHT) | 0.04 |
| Polyvinyl Acetate | 21.771 |
| Calcium Carbonate | 13.275 |
| Polyisobutylene | 15.93 |
| TOTAL | 100.0 |

EXAMPLES 2–5

The following chewing gum samples were prepared for testing. The gum of Example 2 included some of a polyterpene-containing gum base and did not include the syrup blend of glycerin, HSH and water. The gum of Example 3 included only the non-terpene containing gum base of Example 1, and did not include the syrup blend. The gums of Examples 4–5 included the non-tack base of Example 1, and also included 6.8% by weight of a syrup blend of 25% glycerin, 67.5% HSH solids, and 7.5% water.

| | % By Weight In Chewing Gum | | | |
|---|---|---|---|---|
| Ingredient | Ex. 2 | Ex. 3 | Ex. 4 | Ex. 5 |
| Sorbitol | 47.48 | 47.48 | 41.23 | 41.23 |
| Polyterpene-Containing Gum Base | 12.865 | — | — | — |
| Non-Tack Base of Ex. 1 | 12.865 | 25.73 | 25.73 | 25.73 |
| Glycerin | 13.50 | 13.50 | 13.50 | 13.50 |
| Mannitol | 10.00 | 10.00 | 10.00 | 10.00 |
| Spearmint Flavor | 1.60 | 1.60 | 1.60 | 1.60 |
| Water | 0.55 | 0.55 | — | — |
| Lecithin | 0.50 | 0.50 | 0.50 | — |
| Captrin | — | — | — | 0.50 |
| Free Aspartame | 0.15 | 0.15 | 0.15 | 0.15 |
| Encapsulated Aspartame | 0.29 | 0.29 | 0.29 | 0.29 |
| Encapsulated Peppermint Flavor | 0.20 | 0.20 | 0.20 | 0.20 |
| Syrup Blend Of Glycerin, HSH And Water | — | — | 6.80 | 6.80 |
| TOTAL | 100.0 | 100.0 | 100.0 | 100.0 |

The gum sample of Example 2 had adequate cohesion due to the presence of polyterpene-containing gum base. However, the gum sample of Example 3, which included the non-tack, non-terpene containing base of Example 1, and no other base, had a firm and crumbly texture and a burning quality in its flavor.

The gum sample of Example 4, which included the gum base of Example 1 and the syrup blend of glycerin, HSH and water, had substantially improved cohesion compared to the gum sample of Example 3, was softer, and also had improved flavor without the burning quality. Finally, the gum sample of Example 5, in which captrin was added in place of lecithin, had even better cohesion and texture than the gum sample of Example 4.

It should be appreciated that the method of the present invention is capable of being incorporated in the form of a variety of embodiments, only a few of which have been illustrated and described above. The invention may be embodied in other forms without departing from its spirit or essential characteristics. It will be appreciated that the addition of certain other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A sugarless non-tack chewing gum, comprising:
   about 5–95% by weight non-tack chewing gum base;
   about 5–95% by weight sugarless sweetener;
   about 0.1–15% by weight flavoring agent; and
   about 1–10% by weight of a syrup blend;
   wherein the syrup blend includes about 15–30% glycerin, about 65–72% HSH, and about 5–10% water, by weight of the syrup blend.

2. The sugarless non-tack chewing gum of claim 1, wherein the non-tack chewing gum base is substantially free of terpene resins.

3. The sugarless non-tack chewing gum of claim 1, wherein the syrup blend is present at about 3–15% by weight of the chewing gum.

4. The sugarless, non-tack chewing gum of claim 1, wherein the syrup blend is present at about 5–10% by weight of the chewing gum.

5. The sugarless, non-tack chewing gum of claim 1, wherein the syrup blend includes about 22–28% glycerin, about 67–70% HSH, and about 6.5–8.5% water, by weight of the syrup blend.

6. The sugarless, non-tack chewing gum of claim 1, wherein the syrup blend comprises a coevaporated blend of glycerin mixed with HSH and water.

7. A sugarless, non-tack chewing gum, comprising:
   about 5–95% by weight of a non-tack chewing gum base including 5–35% synthetic elastomer, 5–50% gum base softener, 5–40% filler, 0–55% polyvinyl acetate, 0–20% fatty acids, and 0–10% monoglycerides and diglycerides of fatty acids, by weight of the gum base;
   about 5–95% by weight bulk sugarless sweetener;
   about 0.1–15% by weight flavoring agent; and
   about 1–10% by weight of a syrup blend;
   wherein the syrup blend includes about 15–30% glycerin, about 65–72% HSH, and about 5–10% by weight water, by weight of the syrup blend.

8. The sugarless, non-tack chewing gum of claim 7, further comprising a chewing gum softener.

9. The sugarless, non-tack chewing gum of claim 7 wherein the chewing gum softener comprises a medium chain triglyceride.

10. The sugarless, non-tack chewing gum of claim 7, wherein the synthetic elastomer is selected from the group consisting of polyisobutylene, polyisoprene, isobutylene-isoprene copolymer, styrene-butadiene copolymer and combinations thereof.

11. The sugarless, non-tack chewing gum of claim 7, wherein the gum base softener is selected from the group consisting of hydrogenated vegetable oils, partially hydrogenated vegetable oils, animal fats, and combinations thereof.

12. The sugarless, non-tack chewing gum of claim 7, wherein the filler is selected from the group consisting of calcium carbonate, magnesium carbonate, talc, tricalcium phosphate, and mixtures thereof.

13. The sugarless, non-tack chewing gum of claim 7, wherein the bulk sugarless sweetener is selected from the group consisting of sorbitol, mannitol, xylitol, hydrogenated starch hydrolysates, maltitol, and combination thereof.

14. The sugarless, non-tack chewing gum of claim 7, further comprising a high intensity sweetener.

15. The sugarless, non-tack chewing gum of claim 7, wherein the syrup blend comprises about 22–28% glycerin, about 67–70% HSH, and about 6.5–8.5% water, by weight of the syrup blend.

16. A method of making sugarless, non-tack chewing gum, comprising the steps of:
   preparing a non-tack chewing gum base;
   adding, to the chewing gum base, a sugarless bulk sweetener;
   adding, to the chewing gum base, a flavoring agent;
   adding, to the chewing gum base, a syrup blend in an amount of about 1–10% by weight of the chewing gum;
   wherein the syrup blend includes about 15–30% glycerin, about 65–72% HSH, and about 5–10% water, by weight of the syrup blend.

17. The method of claim 16, wherein the syrup blend includes about 22–28% glycerin, about 67–70% HSH, and about 6.5–8.5 % water.

18. The method of claim 16, wherein the syrup blend is prepared by coevaporating a mixture of glycerin with HSH and water.

19. The method of claim 18, wherein the coevaporation is performed under vacuum.

20. The method of claim 18, wherein the coevaporation is performed at a temperature of about 130°–195° F.

21. The method of claim 18, wherein the coevaporation is performed along an isobar on which the water in the mixture has a partial vapor pressure at least about equal to the pressure of an atmosphere above the mixture.

22. The method of claim 16, wherein the syrup blend is added after preparation of the chewing gum base.

\* \* \* \* \*

UNITED STATES PATENT AND TRADEMARK OFFICE
CERTIFICATE OF CORRECTION

PATENT NO. : 5,538,741
DATED : July 23, 1996
INVENTOR(S) : Lindell C. Richey et al.

It is certified that error appears in the above-indentified patent and that said Letters Patent is hereby corrected as shown below:

On the Title Page

Under the heading "FOREIGN PATENT DOCUMENTS", line 2, delete "58-006454" and substitute --83-006454--.

Under the heading "OTHER PUBLICATIONS", line 8, delete "08/360,027" and substitute --08/306,027--.

In column 1, line 11, delete "adhesive" and substitute --abhesive--.

In column 4, line 2, delete "isobutyleneisoprene" and substitute --isobutylene-isoprene--.

In column 5, line 52, delete "It" and substitute --it--.

In column 5, line 65, delete "about".

In column 6, on the third to last line of the table accompanying EXAMPLES 2-5, delete "Syrup Blend Of" and substitute --Syrup Blend of Glycerin, HSH, and Water--.

In column 6, on the second to last line of the table accompanying EXAMPLES 2-5, delete "Glycerin, HSH And Water".

UNITED STATES PATENT AND TRADEMARK OFFICE
CERTIFICATE OF CORRECTION

PATENT NO. : 5,538,741
DATED : July 23, 1996
INVENTOR(S) : Lindell C. Richey et al.

It is certified that error appears in the above-indentified patent and that said Letters Patent is hereby corrected as shown below:

In the Claims

In claim 13, line 4, delete "combination" and substitute --combinations--.

Signed and Sealed this

Ninth Day of September, 1997

BRUCE LEHMAN

*Attest:*

*Attesting Officer*    Commissioner of Patents and Trademarks